United States Patent
Kalker

(10) Patent No.: US 7,123,743 B2
(45) Date of Patent: Oct. 17, 2006

(54) METHOD AND ARRANGEMENT FOR DETECTING A WATERMARK IN AN INFORMATION SIGNAL

(75) Inventor: Antonius Adrianus Cornelis Maria Kalker, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 659 days.

(21) Appl. No.: 10/240,335
(22) PCT Filed: Feb. 11, 2002
(86) PCT No.: PCT/IB02/00414
§ 371 (c)(1), (2), (4) Date: Oct. 1, 2002
(87) PCT Pub. No.: WO02/065753
PCT Pub. Date: Aug. 22, 2002

(65) Prior Publication Data
US 2004/0146177 A1 Jul. 29, 2004

(30) Foreign Application Priority Data
Feb. 17, 2001 (EP) ................... 01200523

(51) Int. Cl.
*G06K 9/00* (2006.01)
(52) U.S. Cl. ...................... 382/100; 713/176
(58) Field of Classification Search .......... 382/100, 382/232, 240; 380/51, 54, 201, 210, 252, 380/287; 713/176, 179; 370/522–529; 348/461, 348/463; 283/42, 74–81, 85, 93, 113, 901, 283/902, 72; 704/200.1, 273
See application file for complete search history.

(56) References Cited

U.S. PATENT DOCUMENTS 6,282,300 B1 * 8/2001 Bloom et al. ............... 382/100
6,570,996 B1 * 5/2003 Linnartz ..................... 382/100
6,731,774 B1 * 5/2004 Hosaka et al. .............. 382/100
6,792,130 B1 * 9/2004 Jones et al. ................. 382/100
6,823,455 B1 * 11/2004 Macy et al. ................. 713/176
6,879,701 B1 * 4/2005 Rhoads ....................... 382/100

FOREIGN PATENT DOCUMENTS

| EP | 0967803 A2 | 6/1999 |
|---|---|---|
| WO | WO9912331 | 3/1999 |
| WO | WO9945705 | 3/1999 |
| WO | WO0004722 | 7/1999 |
| WO | WO9945705 | 9/1999 |

\* cited by examiner

*Primary Examiner*—Matthew C. Bella
*Assistant Examiner*—Abolfazl Tabatabai

(57) ABSTRACT

Disclosed is a method for the detection of pseudo-symmetric watermarks in an information signal. The method includes receiving the information signal, wherein the watermark is embedded in respective sections of the information signal by tiling a finite number of a plurality of watermark patterns, accumulating the sections, and correlating the accumulated sections with a sum of the plurality of watermark patterns. In particular, the information signal is folded as if there was only a single basic pattern. The presence of the watermark is then detected by a cyclic sliding correlating.

7 Claims, 1 Drawing Sheet

METHOD AND ARRANGEMENT FOR DETECTING A WATERMARK IN AN INFORMATION SIGNAL

FIELD OF THE INVENTION

The invention relates to a method and arrangement for detecting a watermark in an information signal.

BACKGROUND OF THE INVENTION

Various methods of embedding a watermark in an information (e.g. video, audio) signal, and corresponding methods of detecting said watermark, are known in the art.

International patent application WO99/12331 discloses a known embedding and detecting method. In this prior art method, different watermark patterns are embedded in respective sections of an information signal (here: image blocks into which the image is divided). Such a watermark, which is built up from a finite number of basic pattern by tiling, is herein referred to as a pseudo-symmetric watermark.

OBJECT AND SUMMARY OF THE INVENTION

It is an object of the invention to provide a method and arrangement for detecting the watermark.

To this end, the method comprises the steps of accumulating said sections, and correlating the accumulated sections with the sum of the basic watermark patterns.

The invention is based on the insight that a known methodology of detecting symmetric watermarks can also be applied to pseudo-symmetric watermarks. International patent application WO 99/45705 discloses a art method of embedding and detecting symmetric watermarks. In this method, a watermark is embedded in a video signal by repeating a single small-sized basic watermark pattern over the extent of the video image. This "tiling" operation allows the watermark detection process to search the watermark over a relatively small space and improves the reliability of detection. A data payload is encoded into the basic watermark tile. As disclosed in WO 99/45705, the watermark is detected by accumulating or "folding" the sections of the image in a buffer (128×128 pixels in a practical embodiment) and correlating the buffer contents with the single 128×128 basic watermark pattern. Applying Symmetrical Phase Only Matched Filtering (SPOMF) in the detector renders the relative position of the reference watermark with respect to the image irrelevant. The known detector is thus invariant with respect to translation and cropping, two processes that the image may have undergone prior to watermark detection. SPOMF also makes it possible to easily encode a multi bit payload in the basic watermark pattern.

The inventors have found that the detection method known from WO 99/45705 can also effectively and reliably be applied to pseudo-symmetric watermarks if the following conditions are fulfilled: (1) each of the multiple patterns occurs with approximately equal probability, (2) the patterns are pairwise orthogonal or at least have little correlation, and (3) the patterns are all of equal size.

A particular advantage of the invention is that complicated circuits of different watermark detectors can be shared, if multimedia content is watermarked by pseudo-symmetric as well as symmetric watermarks. It is currently envisaged to merge two such different watermark embedding methods (although not necessarily the two methods mentioned above).

DESCRIPTION OF EMBODIMENTS

Figure 1:
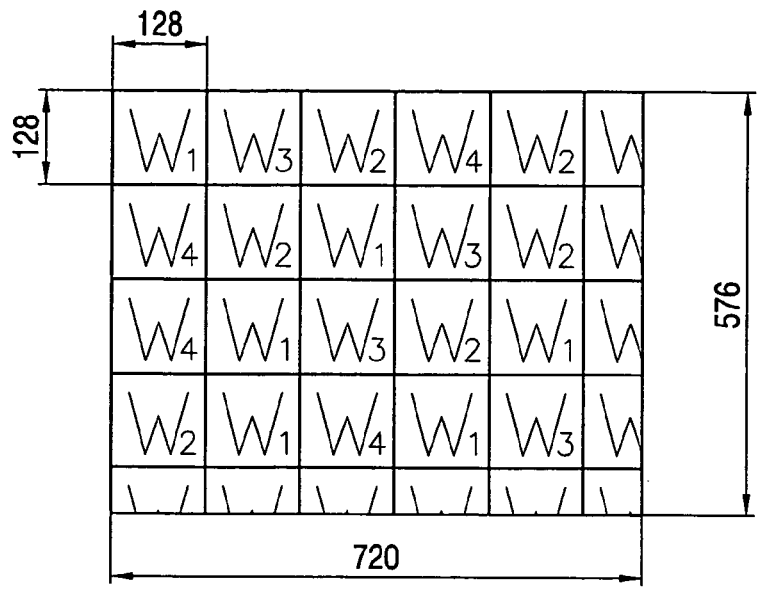
FIG. 1 shows schematically an image with an embedded pseudo-symmetric watermark in the form of multiple basic watermark patterns $W_1 \ldots W_N$.

FIG. 1 shows schematically an image with an embedded pseudo-symmetric watermark in the form of multiple basic watermark patterns $W_1 \ldots W_N$.

Figure 2:
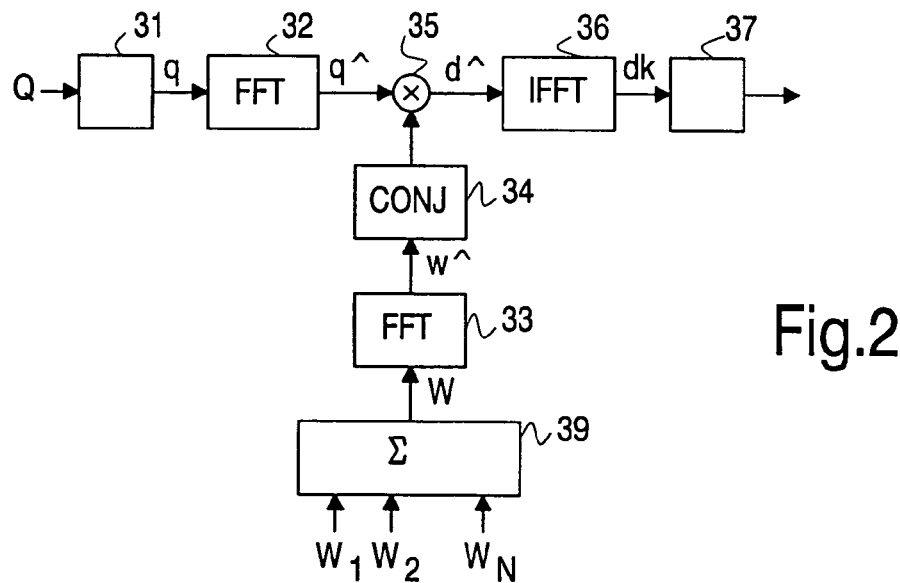
FIG. 2 shows a schematically an embodiment of a watermark detector in accordance with the invention.
Figure 3:
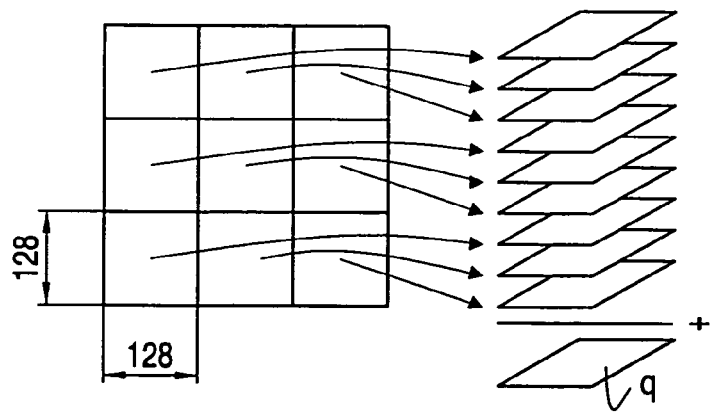
FIG. 3 shows a diagram to illustrate an operation carried out by the watermark detector which is shown in FIG. 2.

FIG. 2 shows a practical embodiment of a watermark detector in accordance with the invention. The detector receives possibly watermarked images Q. The image (or a number of accumulated video frames) is partitioned into blocks having the size $M_1 \times M_2$ of the basic watermark pattern (here 128×128). The blocks are then stacked in a buffer q of size $M_1 \times M_2$ as illustrated in FIG. 3. These operations are carried out by a folding and buffer circuit 31.

By folding the suspect signal as if there was only a single basic pattern, the fold buffer will have the sum pattern $W=W_1+ \ldots +W_N$ as a strong component. The presence of the watermark can then be detected by a cyclic sliding correlating the buffer contents with W. The reliability thereof down with a factor Sqrt[N] with respect to optimal correlation (i.e. synchronized correlation with the full signal watermark).

In order to correlate the buffer contents with W, the detector comprises an adding stage 39 in which the basic watermark patterns $W_1$–$W_N$ are sample wise added.

The operation of the detector further corresponds with the disclosure of WO 99/45705 and will here briefly be repeated. Computing the correlation of a suspect information signal q with a watermark pattern w comprises computing the inner product $d=<q,w>$ of the information signal values and the corresponding values of the watermark pattern. For the two-dimensional $M_1 \times M_2$ image block $q=\{q_{ij}\}$ and watermark pattern $W=\{w_{ij}\}$, the inner product can be written in mathematical notation as:

$$d = \frac{1}{M_1 M_2} \sum_{i=1}^{M_1} \sum_{j=1}^{M_2} q_{ij} w_{ij}.$$

Because the suspect image Q may have undergone manipulations such as translation or cropping prior to the watermark detection, the detector does not know the spatial location of the watermark pattern W with respect to the boundaries of image block q. A multiple of correlations $d_k$ must therefore be calculated for all possible shift vectors k ($k_x$ pixels horizontally and $k_y$ pixels vertically):

$$d_k = \frac{1}{M_1 M_2} \sum_{i=1}^{M_1} \sum_{j=1}^{M_2} q_{ij} w_{i+k_x, j+k_y}$$

Said correlation values $d_k$ can be simultaneously computed using the (Fast) Fourier Transform. Both the contents of buffer q and the basic watermark pattern W are subjected to a Fast Fourier Transform (FFT) in transform circuits 32 and 33, respectively. These operations yield:

$$\hat{q} = FFT(q) \text{ and}$$

$$\hat{w} = FFT(w),$$

where $\hat{q}$ and $\hat{w}$ are sets of complex numbers.

Computing the correlation is similar to computing the convolution of q and the conjugate of W. In the transform domain, this corresponds to:

$$\hat{d} = \hat{q} \otimes conj(\hat{w})$$

where the symbol $\otimes$ denotes point wise multiplication and conj( ) denotes inverting the sign of the imaginary part of the argument. In FIG. 3, the conjugation of $\hat{w}$ is carried out by a conjugation circuit 34, and the point wise multiplication is carried out by a multiplier 35. The set of correlation values $d = \{d_k\}$ is now obtained by inverse Fourier transforming the result of said multiplication:

$$d = IFFT(\hat{d})$$

which is carried out by an inverse FFT circuit 36. The correlation values $d_k$ are subsequently compared with a given threshold in a threshold circuit 37. The image is detected to be watermarked if one of the correlation values has a significant peak, i.e. larger than the threshold.

If it is necessary to detect whether the individual patterns $W_1-W_N$ are embedded, the same circuit can be used. The pattern to be checked ($W_1$, $W_2$, etc.) is then applied only to the arrangement which is shown in FIG. 2.

In a further embodiment of the method according to the invention, the size-M fold buffer is used to retrieve the position of the 128×128 tiling grid. Using the synchronized tiling grid, the the partial correlations $C_{i,j} = <Y_i, W_{-j}>$ are computed, where i is the ith suspect signal tile, $W_j$ is as before, and < > denotes the inner product. This reduces the translation search to steps over the grid, using only the partial correlation values $C_{i,j}$. If there is additional structure in the full watermark, e.g. in case of a higher level symmetry in terms of the tiles $W_i$, then very efficient detection is possible.

The invention can be summarized as follows. A pseudo-symmetric watermark is watermark pattern that is built up from a finite number of basic pattern by tiling. The well-known WaterCast pattern that is built up from one single pattern is a special case of this, and is referred to as a symmetric watermark pattern. It is well known that symmetric patterns allow an efficient detection method that consist of two phases, viz. first an accumulation phase, followed by a cyclic sliding correlation with the basic pattern over the accumulated data. The invention provides a detection method for pseudo-symmetric watermarks with a similar reduction in complexity as with symmetric watermarks, i.e. an accumulation phase followed by one or more cyclic sliding correlation steps (using the finite number of basic patterns). Let $W_1, \ldots, W_N$ be the set of basic patterns, all of size M. The suspect signal is folded (31) as if there was only a single basic pattern. The fold buffer will have the sum pattern $W = W_1 + \ldots + W_N$ (39) as a strong component. The presence of the watermark can then be detected by a cyclic sliding correlating with W.

The invention of claim is:

1. A method of detecting a watermark in an information signal, the watermark being embedded by tiling a plurality of different basic watermark patterns in respective sections of the information signal, comprising the steps of accumulating said sections, and correlating the accumulated sections with the sum of the basic watermark patterns.

2. The method as claimed in claim 1, wherein the correlation value is used to determine the presence and/or payload of the watermark.

3. The method as claimed in claim 1, wherein the correlation value is used to determine the position of the tiling grid.

4. The method as claimed in claim 1, further comprising the step of correlating individual sections with individual basic patterns.

5. The method as claimed in claim 3, wherein the tiling grid is used to locate the individual sections.

6. An arrangement for detecting a watermark in an information signal, the arrangement comprising:
  a receiver to receive the information signal, wherein the watermark is embedded in respective sections of the information signal by tiling plurality of watermark patterns;
  an accumulator to accumulate the sections; and
  a correlator to correlate the accumulated sections with a sum of the plurality of watermark patterns.

7. A method of detecting a watermark in information signal, the method comprising the steps of:
  receiving the information signal, wherein the watermark is embedded in respective sections of the information signal by tiling a plurality of watermark patterns;
  accumulating said sections; and
  correlating the accumulated sections with a sum of the plurality of watermark patterns.

* * * * *